(12) United States Patent
Arnold et al.

(10) Patent No.: US 8,140,876 B2
(45) Date of Patent: Mar. 20, 2012

(54) REDUCING POWER CONSUMPTION OF COMPONENTS BASED ON CRITICALITY OF RUNNING TASKS INDEPENDENT OF SCHEDULING PRIORITY IN MULTITASK COMPUTER

(75) Inventors: Jeremy A. Arnold, Rochester, MN (US);
Scott A. Moore, Rochester, MN (US);
Gregory A. Olson, Rochester, MN (US);
Eric J. Stec, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/354,816

(22) Filed: Jan. 16, 2009

(65) Prior Publication Data

US 2010/0185882 A1 Jul. 22, 2010

(51) Int. Cl.
*G06F 1/32* (2006.01)
(52) U.S. Cl. .................. 713/320; 713/324; 718/107
(58) Field of Classification Search .................. None
See application file for complete search history.

(56) References Cited

U.S. PATENT DOCUMENTS

| | | | |
|---|---|---|---|
| 7,111,182 B2 | 9/2006 | Gary | |
| 7,526,661 B2* | 4/2009 | Nakajima et al. | 713/320 |
| 2009/0293061 A1* | 11/2009 | Schwinn et al. | 718/103 |
| 2010/0058086 A1* | 3/2010 | Lee | 713/322 |

OTHER PUBLICATIONS

IBM & Monavista, "Dynamic Power Management for Embedded Systems", Version 1.1, pp. 1-25, Nov. 19, 2002.
Roodyn, Neil, "Mobile PC Power Management", MSDN Tablet PC Technical Articles, http://msdn2.microsoft.com/en-us/library/ms812491(printer).aspx, Jun. 2005.
Floyd, M.S., et al, "System Power Management Support in the IBM Power 6 Microprocessor", IBM J. Res. & Dev., vol. 51, No. 6, pp. 733-746, Nov. 2007.

* cited by examiner

*Primary Examiner* — Kenneth Kim
(74) *Attorney, Agent, or Firm* — Wood, Herron & Evans LLP

(57) ABSTRACT

A method, apparatus, and program product are provided for managing power consumption in a computer system based on the degree with which performance of tasks can be degraded in order to save power. A criticality value controls the degree with which performance of a task may be degraded is associated with tasks within a computer system. Power consumption of the computer system is then managed based on the criticality values associated with tasks executing within the computer system. A reduction in computer system power consumption can be realized by degrading the performance of non-critical tasks, which is accomplished by reducing the power consumed by at least a portion of the computer system. Power can also be reduced by scheduling non-critical tasks to portions of the computer system and reducing power consumption of other portions of the computer system.

23 Claims, 4 Drawing Sheets

REDUCING POWER CONSUMPTION OF COMPONENTS BASED ON CRITICALITY OF RUNNING TASKS INDEPENDENT OF SCHEDULING PRIORITY IN MULTITASK COMPUTER

FIELD OF THE INVENTION

The present invention relates to computers and computer systems, and more particularly to a method for managing power consumption in a computer system.

BACKGROUND OF THE INVENTION

Managing power consumption has always been important for computers. For example, power consumption has always been particularly important for portable computers and other electronic devices powered by batteries. Because batteries only store a finite amount of energy, designers of battery-operated computers have always considered power consumption to be an important design constraint. Portable computers can operate for longer periods of time without recharging the batteries when power consumption is effectively managed. This cognizance of power consumption has been extended to the development of desktop and server data processing systems (e.g., computer systems), shifting the focus from more traditional aspects such as the volume of data stored, the speed at which operations are completed, or the flexibility of the types of operations which may be performed.

Though non-portable data processing systems do not run out of battery power, designing such systems to reduce power consumption results in cost savings and in the conservation of natural resources. Energy efficient systems enjoy a reduction in operating cost because less energy need be purchased to power the systems. Conserving natural resources is an added benefit of the lower power requirements of energy efficient systems. Systems that require less power require fewer natural resources to be converted into energy. Additionally, in the larger data processing system context, a reduction in power consumption may be necessary to achieve eligibility for certain environmental impact standards or labels such as the "Energy Star" rating system established by the United States Department of Energy and the Environmental Protection Agency.

Another benefit provided by energy efficient systems is a reduction in heat production. The amount of heat produced by a computer system is proportional to power consumption. Thus, energy efficient systems produce less heat because they consume less power. Furthermore, systems producing less heat may be even more energy efficient because less power is required to operate the cooling systems used to dissipate the heat produced by the systems. Energy efficient systems pose fewer design constraints related to heat issues. In the context of larger data processing systems, heat issues, and the associated cooling requirements, may be more of a concern than power consumption iteself.

In conventional data processing systems, power consumption may be reduced by reducing the voltage applied to idle or underutilized portions of the system, such as processors, processing cores, or processing core units. The frequency of a clock signal applied to such portions may also be adjusted to reduce power consumption. Other techniques involve completely or partially shutting down such portions of the system until the portions are needed again.

Power management strategies, such as those identified above, are generally governed by a power management policy. Contemporary power management policies are generally configured to attempt to reduce power consumption with a minimal impact on performance. Thus, power management policies generally make system resources available to any task ready to execute, regardless of the importance of the task. One exception to the general practices is a "power capping" power management policy. The power capping policy adjusts performance as needed in order to satisfy a maximum threshold of power consumption. However, a power capping policy is not generally flexible enough to effectively reduce power consumption while still having minimal effect on performance. Power management policies may also change over time in response to changes in power or performance constraints.

Power management strategies, however, are usually only effectively employed when a portion of the system is underutilized. Contemporary data processing systems, particularly servers, frequently run background tasks such as batch jobs or system maintenance tasks. These background tasks may prevent portions of a system from being idle, limiting the effectiveness of the strategies employed in power management policies, as the system is kept busy performing work, which is necessary, though not necessarily critical in nature, from the standpoint of performance.

Tasks that execute in a computer are often assigned a priority, which is often used to balance work across the computer, e.g., by scheduling tasks according to their relative priorities. In many cases, however, there is a difference between whether a task executing within a computer system is of high priority from a workload-balancing standpoint and whether the task is critical from a performance or power management standpoint. High priority tasks generally have access to more system resources than lower priority tasks. But, high priority tasks may not have firm response time constraints. For example, after a user in a web application creates an order, one task in the system may be responsible for sending an email confirmation message. This task may be high priority, since it is more important than lower priority background tasks. But it may have a low criticality, since an extra delay before the email message is sent would be acceptable. Thus, degrading or delaying the performance of this task in order to reduce power consumption may be acceptable in some scenarios.

In contrast, some more performance critical tasks may have rigid response time constraints that must be satisfied, and it would be considered unacceptable to degrade or delay performance of these tasks in order to reduce power consumption. Indeed, some performance critical tasks may be granted low priorities irrespective of their high criticality from a performance standpoint. For example, a database application may include a task to perform certain maintenance operations in the background. This task would be considered low-priority, since user requests would take precedence over this maintenance activity. But the task may have medium- or high-criticality, because it would be unacceptable to delay these maintenance operations indefinitely. As a result, the priority assigned to a task typically cannot be relied upon as a reliable predictor of the criticality of the task from the standpoint of performance and power management.

In addition, the relative criticality among tasks, system performance requirements, and system power consumption requirements may change over time. For example, a Java Just-In-Time (JIT) Compiler typically asynchronously compiles frequently executed code at increasingly higher optimization levels. The code compiled by the JIT Compiler may be executed by applications on a Java Virtual Machine (JVM). Tasks associated with the JIT Compiler may be critical during the startup of the JVM when code is initially loaded and interpreted. At this startup phase, the code optimizations performed by the JIT Compiler may be critical because large performance gains are realized by optimizing the un-optimized code. But, tasks associated with the JIT Compiler may become non-critical when the performance gains become marginal after most of the frequently executed code has been compiled at a low optimization level and the JIT Compiler is only performing further optimization.

What is needed, therefore, is an improved method to manage power consumption in a computer system that is better able to account for the critical nature of tasks executing in the system.

SUMMARY OF THE INVENTION

The invention addresses these and other problems associated with the prior art by providing a method, an apparatus, and a program product that utilize the criticality of a task to control the degree with which task performance can be degraded in order to save power in connection with managing power consumption in a computer system. The criticality of a task typically refers to the degree with which performance of the task may be degraded in order to reduce power consumption in the system. Tasks with high criticality typically are required to be completed with little or no performance degradation, while tasks with low criticality typically are more amenable to being degraded or delayed in order to enable the power consumption of a computer system to be reduced. As will become more apparent below, the criticality of a task is typically independent of any priority assigned to the task, and in some embodiments, a task may be associated with both a priority and a criticality to ensure that, for example, tasks that are high priority but are of low criticality will not preclude reducing system power consumption.

In one embodiment of the invention, power consumption in a computer system is managed by associating with each of a plurality of tasks executing in the computer system a criticality value with the criticality value controlling a degree with which a performance of the task can be degraded in order to reduce power consumption in the computer system. Power consumption in the computer system may be managed based on the criticality values associated with at least a subset of the tasks executing in the computer system, including reducing power consumption of at least a portion of the computer system during execution of a first task among the plurality of tasks. The power consumption may be reduced based at least in part on the criticality value associated with the first task such that performance of the first task is degraded.

In another embodiment of the invention, power consumption in a multicore computer system is managed by associating with each of a plurality of tasks executing in the computer system a criticality value with the criticality value of each task controlling a degree with which a performance of the associated task can be degraded in order to reduce power consumption in the computer system. Power consumption in the multicore computer system may be managed based on the criticality values associated with at least a subset of the tasks executing in the multicore computer system, including reducing power consumption of a first subset of processing cores among the plurality of processing cores in the computer system relative to a second subset of processing cores among the plurality of processing cores. A first task among the plurality of tasks is scheduled to execute on a processing core from one of the first and second subsets of processing cores based at least in part on the criticality value associated with the first task.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the invention manage power consumption of a computer system based on a criticality associated with tasks executing in the system. The criticality of a task executing in the system controls a degree with which performance of the task may be degraded in order to reduce power consumption in the system. Tasks executing in the system may be processes, jobs, or threads. A system may use the criticality of tasks to determine whether portions of a system can enter a reduced power state and/or to schedule work to optimize power consumption. For example, in some embodiments, non-critical tasks may be scheduled to one portion of a system to allow for other, unused portions of the system to be configured in a low power state to reduce overall system power. Alternatively, in other embodiments, critical tasks may be scheduled to one portion of the system, and non-critical tasks may be scheduled to another portion of the system running at a lower power level to reduce overall system power consumption. Other modifications will be apparent to one of ordinary skill in the art having the benefit of the instant disclosure.

Figure 1:
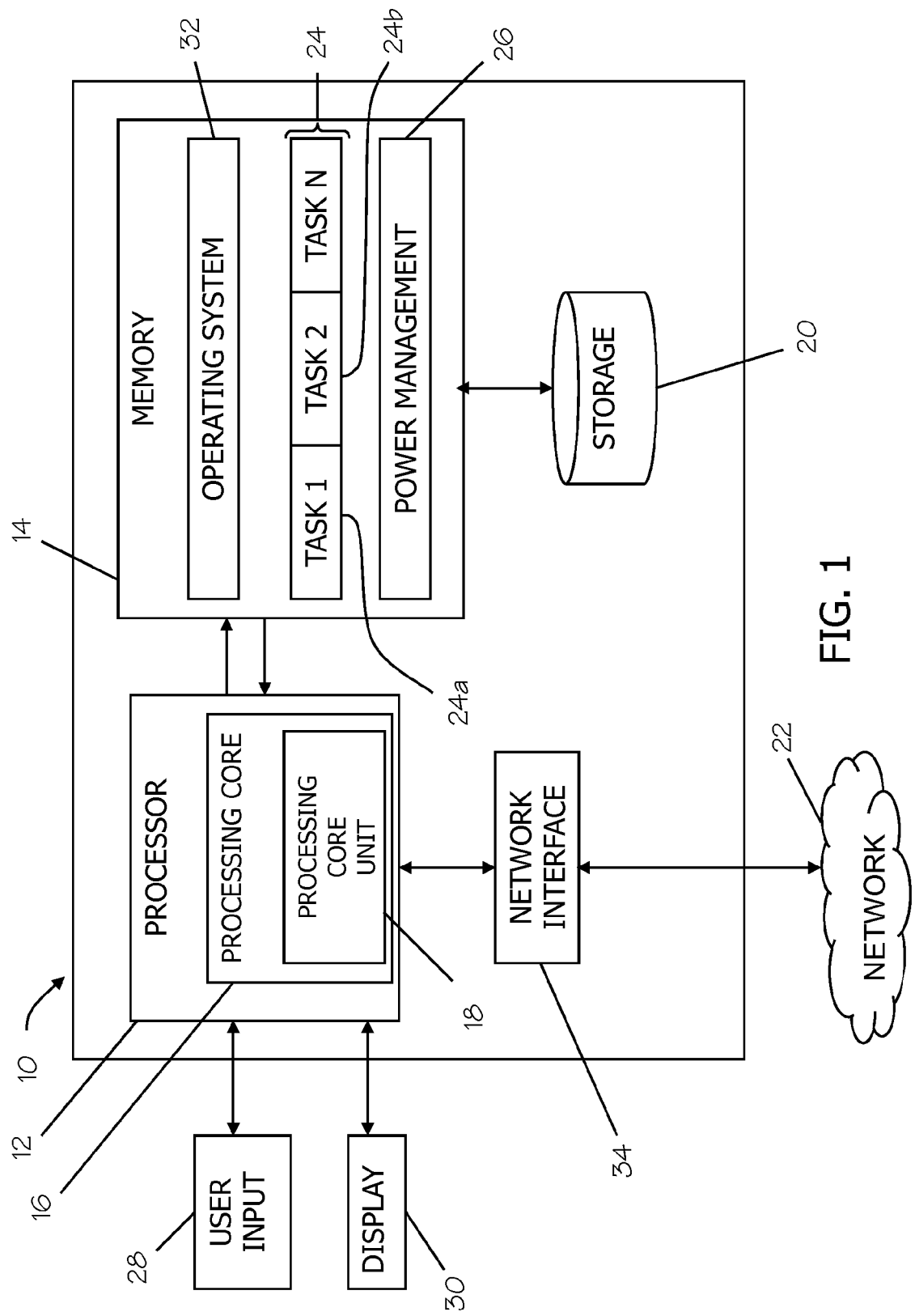
FIG. 1 is a block diagram of an exemplary hardware and software environment for a computer suitable for implementing power management using task criticality consistent with embodiments of the invention.

Turning now to the drawings, wherein like numbers denote like parts throughout the several views, FIG. 1 illustrates an exemplary hardware and software environment for an apparatus 10 suitable for managing power consumption consistent with the invention. For the purposes of the invention, apparatus 10 may represent practically any computer, computer system, or programmable device (e.g., multi-user or single-user computers, desktop computers, portable computers and devices, handheld devices, network devices, mobile phones, etc.). Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors). Processor 12 may additionally include a processing core 16. While only one processing core 16 is illustrated, one skilled in the art will realize that processor 12 may contain multiple processing cores 16. Processing core 16 generally includes at least one processing core unit 18. Similarly, while one processing core unit 18 is illustrated, one skilled in the art will realize that processing core 16 may contain multiple processing core units 18. Processing core units 18 are logic circuits in the processing core 16 that may be shut off or slowed down in order to reduce power consumption. Some examples of a processing core unit 18 are an Execution Unit (XU), a Load/Store Unit (LSU), a Fixed Point Unit (FXU), a Floating Point Unit (FPU), etc. Memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 20 or another computer coupled to computer 10 via a network 22.

In the context of embodiments of the invention, at least one task may be resident in memory 14. For example, a set of tasks 24, including Task 1 (24a) and Task 2 (24b), may be resident in memory 14, and currently being executed by processor 12 or waiting to be executed by processor 12. Also resident in memory 14 may be a power management component 26. Power management component 26 typically controls the power consumption of the computer 10. Power management component 26 may use information and attributes associated with the set of tasks 24 in order to manage power consumption according to a power management policy. Portions of the power management component 26 may also run externally. For example, a piece of software running on a separate system may be used to remotely control the power management capabilities of computer 10. This can be useful in configurations where the external software could be used to control multiple systems. In other configurations, portions of the power management capabilities may be part of the operating system, embedded in firmware, and/or implemented in the hardware itself.

Computer 10 also typically receives a number of inputs and outputs for communicating information externally. For interface with a user or operator, computer 10 typically includes one or more user input devices 28 (e.g., a keyboard, a mouse, a trackball, a joystick, a touchpad, a keypad, a stylus, and/or a microphone, among others). Computer 10 may also include a display 30 (e.g., a CRT monitor, an LCD display panel, and/or a speaker, among others). The interface to computer 10 may also be through an external terminal connected directly or remotely to computer 10, or through another computer communicating with computer 10 via a network 22, modem, or other type of communications device.

Computer 10 operates under the control of an operating system 32, and executes or otherwise relies upon various computer software applications, components, programs, objects, modules, data structures, etc. For example, power management component 26 may use information or attributes associated with the set of tasks 24 in order to manage the power consumption of the computer 10. Computer 10 communicates on the network 22 through a network interface 34.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the invention utilize the criticality of a task to control the degree with which task performance can be degraded in order to save power in connection with managing power consumption in a computer system. At a general level, criticality determines whether the response time constraints of a task warrant keeping the system in a high power state in order to execute the task. At any given time, tasks executing within a computer system may have differing levels of criticality. Additionally, the criticality levels of these tasks may also change over time. Some tasks may be critical enough to prevent degrading task performance in order to reduce system power consumption. Degrading the performance of such tasks may be inappropriate because slowing task execution may cause the task to not complete within a required time window. But, reducing power consumption by degrading the performance of other, less critical tasks may be appropriate. Occasionally, the number of tasks executing on the system is small enough that maximizing the performance of the tasks still leaves portions of the system idle or underutilized. Deciding to employ power saving strategies is less challenging in such cases because power consumption may be reduced without sacrificing system performance. But, deciding whether and when to reduce power consumption when the system is not idle is more challenging. The task criticality attribute of the present invention provides a useful means for deciding when to reduce system power consumption.

Once task criticality has been utilized in the decision to reduce power consumption, there are numerous strategies and methodologies that may be used to implement the reduction in power consumption consistent with the invention. These strategies that implement power consumption reduction may be applied to the entire system or only to portions of the system, such as processors 12, processing cores 16, or processing core units 18. Moreover, some power management strategies may also be applied to memory 14. Commonly employed strategies that may be utilized in the embodiments discussed herein may include reducing the voltage applied to portions of the system, reducing the frequency of portions of the system, or completely or partially shutting down portions of the system. Employing any of these strategies places at least a portion of the system in a lower power state because that portion generally consumes less energy after the voltage is reduced, the frequency is reduced, or is partially or completely shut down. But, the potential impact on system performance should be considered before employing any of these strategies.

In business critical applications, such as web sites or servers, tasks that are important to the successful operation of the business may be critical. An example of such a task is the operation of an Internet web site. It may be desirable to not sacrifice the performance of such a critical task in order to reduce power consumption. In order to keep current and potential customers satisfied, it may be desirable to allow the website tasks to have access to sufficient system resources to keep website performance at a satisfactory level. It would generally be inappropriate to reduce the system power consumption if the reduction results in delayed execution of such critical tasks. Thus, operating a business website is an example of a critical task where reducing task performance in order to reduce power consumption may be undesirable. The performance and timely execution of critical tasks typically outweighs any potential power savings that may result in slowing down the critical tasks.

However, other tasks may be less critical, allowing their performance to be degraded in order to reduce system power consumption. Background tasks, such as indexing a file system for faster searching, routine maintenance tasks, or other tasks that seek to optimize system performance should be allowed to execute. But, the time it takes for these background tasks to execute is typically not as critical as the operation of the web site, for example. Therefore, the time it takes for the background tasks to execute often may be increased in order to save power. Such non-critical tasks generally do not have rigid response time constraints. Tasks that seek to optimize system performance or allow other tasks to execute quicker or more efficiently may not be as critical because the marginal gains in system performance sacrificed by delaying such tasks are outweighed by power savings from slowing execution of the tasks. For example, increasing the amount of time it takes to perform the non-critical task of indexing the file system for faster searching may be acceptable if system power consumption can be reduced.

The invention relies upon criticality to manage system power consumption. But, embodiments of the invention may base the criticality value of a task on the task's priority value. Priority is a well-known attribute in the art that is typically associated with tasks executing in a computer system. The priority value of a task is used for a variety of purposes, including balancing work, avoiding priority inversion, and assigning relative priorities among tasks. While the criticality of a task may be based in part on the priority of the task, using task priority directly as an indication of criticality is inadequate. Using priority alone to manage power consumption is inadequate because the traditional notion of task priority cannot be easily adapted to effectively manage power consumption. The way in which programmers and system administrators traditionally set task priority is geared towards balancing work and avoiding priority inversion, not towards reducing power consumption. The traditional notion of priority does not permit adequate management of power consumption as can be seen in the following two examples, which illustrate two situations where using priority alone would be insufficient for managing power consumption.

If only task priority were used to manage power consumption, important low priority tasks could improperly be categorized as tasks whose performance may be degraded in order to reduce power consumption. For example, interactive tasks with loose response time constraints may be executing concurrently with batch tasks with rigid response time constraints. The interactive tasks execute in short bursts and would have a higher priority in order to reduce the time that the user has to wait for the tasks to complete. The batch tasks would have a lower priority because there is no user waiting on their immediate completion. The interactive tasks may have loose response time constraints if there is no window within which the tasks must complete. In contrast, the batch tasks may have rigid response time constraints if there is a definitive window within which the tasks must complete. In this case, the performance of the batch tasks would improperly be degraded in order to reduce power consumption if system power consumption were solely managed on the basis of the low priority value of the tasks. Such a determination could prevent the important batch tasks from executing within a required time window.

In a similar manner, a power management system based only on priority value could improperly prevent the degradation in the performance of unimportant high priority tasks. For example, all tasks within a job, such as processes or threads within a process, may share the same priority value, but some tasks may be more important than others. This scenario is fairly common because the treatment of task priority varies from platform to platform, making it difficult for cross-platform applications to depend on a particular handling of tasks with differing priorities. In order to ensure that the performance of a task within the job that has rigid response time constraints is not sacrificed, all tasks, including unimportant tasks, would have to be marked as high priority. Embodiments of the invention address the insufficiencies of using task priority alone to manage power consumption by implementing and utilizing a criticality value, separate from thread priority. A separate criticality value allows power to be managed more effectively.

Criticality is not limited to jobs or processes. Threads within a single job may have differing levels of criticality. For example, in the context of a Java Virtual Machine (JVM), application threads may be executing concurrently with a Just-In-Time (JIT) Compiler. The JIT typically uses a background thread that asynchronously compiles frequently executed code at increasingly higher optimization levels while the application threads continue to execute sub-optimal code. In this case, the application threads are critical while the background thread is non-critical. It may be desirable to not sacrifice performance of the application threads in order to save power. But, performance of the background thread performing code optimization could be degraded in order to save power. When the system is otherwise idle, the system may enter a lower power state where the background thread may perform code optimization at a reduced level of performance.

Figure 2:
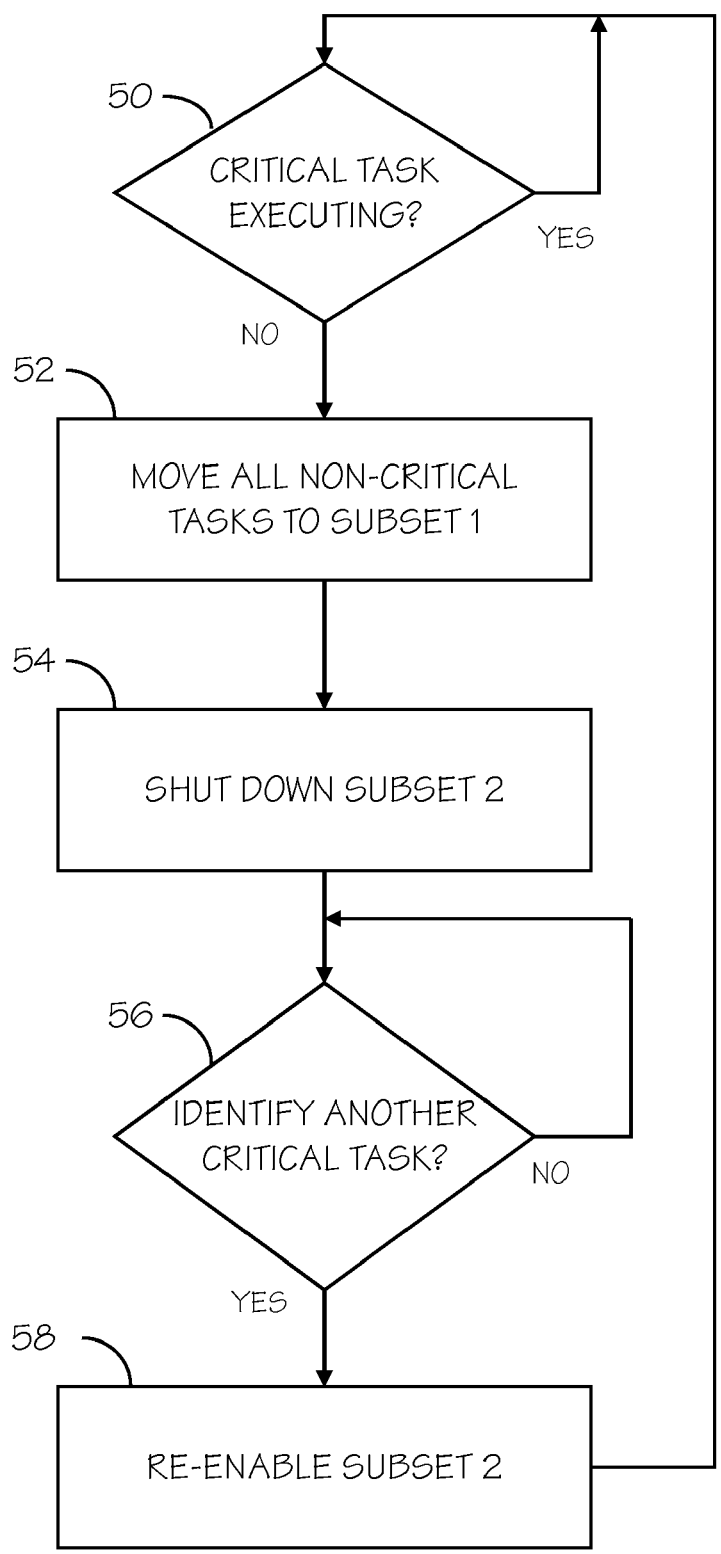
FIG. 2 is a flowchart of an exemplary process for managing power consumption of a multicore computer system based on task criticality consistent with the embodiments of the invention.

In one embodiment of the invention, power consumption of a multicore system may be managed according to the process illustrated in the flowchart in FIG. 2. There may be a plurality of tasks executing on the computer system, each of which may be associated with a criticality value. The criticality values may be utilized to manage system power consumption by first determining in block 50 whether a critical task is executing on the computer system. If a critical task is executing ("yes" branch of block 50), power consumption may not be altered and the system may continue to evaluate whether a critical task is executing. If a critical task is not executing on the computer system ("no" branch of block 50), system power consumption may be reduced by first scheduling all of the non-critical tasks to a first subset of processor cores in block 52. The tasks may be scheduled to the first subset of processor cores in such a way that a second subset of processor cores is unused. This unused subset of processor cores may be shut down in block 54 in order to reduce system power consumption. Upon identifying another critical task in block 56, the second subset of processor cores is re-enabled in block 58 and the process continues at block 50.

Figure 3:
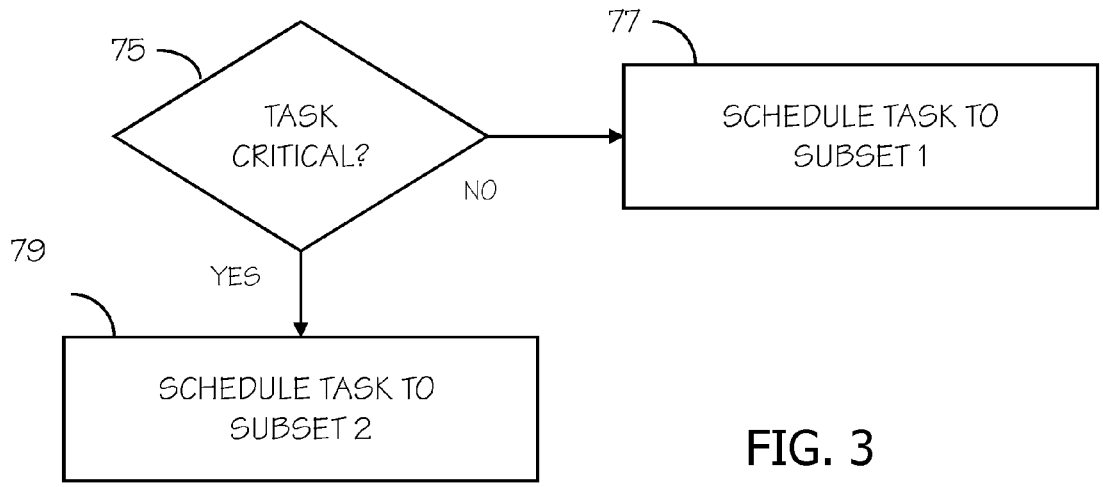
FIG. 3 is a flowchart of another exemplary process for managing power consumption of a multicore computer system based on task criticality consistent with the embodiments of the invention.

In an alternate embodiment of the invention, power consumption of a multicore system may be managed according to the process illustrated in the flowchart in FIG. 3. There may be a plurality of tasks executing on the computer system, each of which may be associated with a criticality value. The flowchart in FIG. 3 illustrates how an individual task may be scheduled based upon the criticality value of the task. A determination is made as to whether the task is critical in block 75. If the task is non-critical ("no" branch of block 75), the task may be assigned to a first subset of processing cores in block 77. If the task is critical ("yes" branch of block 77), the task may be assigned to a second subset of processing cores in block 79. If the scheme depicted in FIG. 3 is followed for all tasks executing on the computer system, then the first subset of processing cores may only be executing non-critical tasks and the second subset of processing cores may only be executing critical tasks. The first and second subset of processing cores may be operating at differing levels of power consumption relative to one another. For example, the first subset of processing cores, executing non-critical tasks, may be operating at a reduced level of power consumption relative to the second subset of processing cores, executing critical tasks. If only non-critical tasks are executing on the computer system, each task may be scheduled to execute on a processing core from a third subset of processing cores, and at least one processing core from a fourth subset of processing cores can be configured to enter a low power state. The third and fourth subsets of processing cores may be the same as, different from, or overlap with, the first and second subsets of processing cores.

Figure 4:
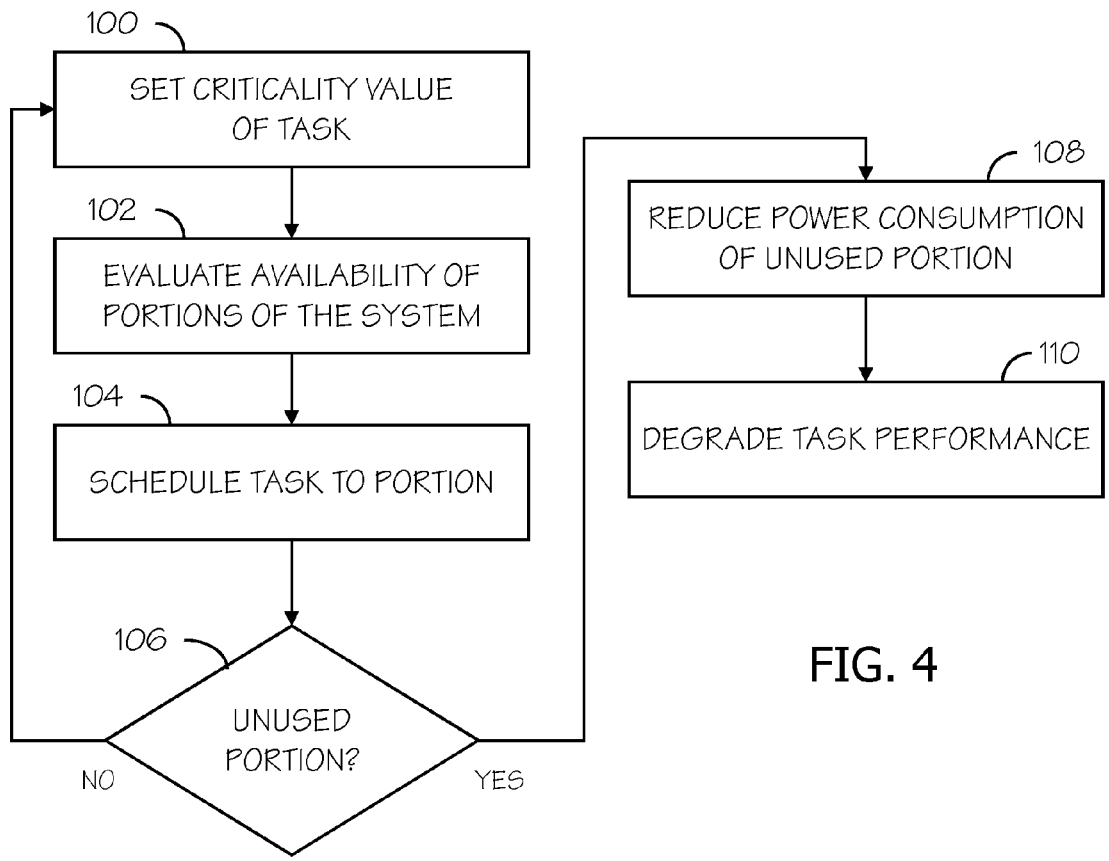
FIG. 4 is a flowchart of an exemplary process for managing computer system power consumption based on task criticality consistent with the embodiments of the invention.

In another alternate embodiment of the invention, system power consumption may be managed according to the process illustrated in the flowchart in FIG. 4. The criticality value of a task is set in block 100. The availability of portions of the system is evaluated in block 102 to determine to which portion of the system the task should be scheduled. The criticality value of the task may also be used in the determination to which portion of the system the task should be scheduled. Based upon this evaluation, the task is scheduled to a portion of the system in block 104. If no portion of the system is unused after the task is assigned to a portion of the system ("no" branch of block 106), the process repeats, beginning again at block 100. By looping through the process, changes in system availability and changes in task criticality may be utilized to reduce power consumption. If any portion of the system is unused after the task is assigned to a portion of the system ("yes" branch of block 106), then the system may reduce power consumption in block 108, which may then result in degrading task performance in block 110. Task performance may be degraded in block 110 due to pausing the task, executing the task at a slower speed, stopping the task, or executing the task using resources being shared by other tasks. The reduction in power consumption in block 108 may be determined by a power management policy, which may be specified by a user, generally a system administrator. Reducing power consumption in block 108 may be achieved by reducing clock rates of portions of the system, reducing voltages of portions of the system, or partially or completely shutting down portions of the system. Any combination of these methods may result in lower power requirements for at least a portion of the system, which in turn reduces the power consumption of the overall system. The power management policy that determines the particular method employed in block 108 to reduce power consumption may change over time. For example, a power management policy may be less aggressive during times of the day when power is cheaper, but more aggressive during times of the day when power is more expensive.

Figure 5:
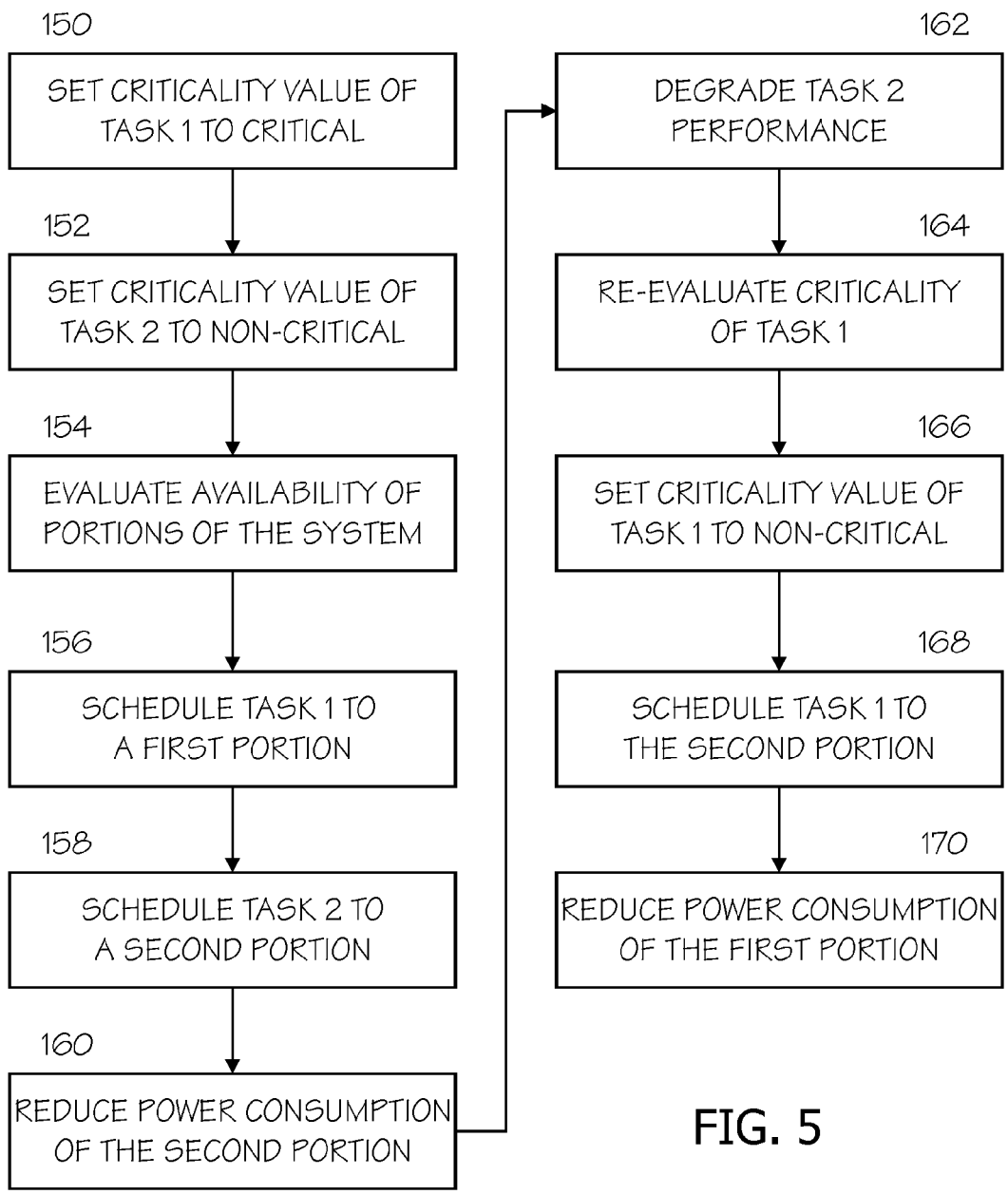
FIG. 5 is a flowchart of another exemplary process for managing computer system power consumption based on task criticality consistent with the embodiments of the invention.

In other alternate embodiments, system power consumption may be managed according to the process illustrated in the flowchart in FIG. 5. In the particular embodiment of FIG. 5, Task 1 (24a) and Task 2 (24b) may be resident in memory 14, currently being executed by processor 12 or waiting to be executed by processor 12. Task 1 (24a) may be critical while Task 2 (24b) may be non-critical. The process of FIG. 5 may manage power consumption by scheduling tasks to different portions of the system based on task criticality in order to optimize power consumption. For example, the criticality indicator of Task 1 (24a) may be set to critical in block 150. The criticality indicator of Task 2 (24b) may be set to non-critical in block 152. The availability of portions of the system may be evaluated in block 154. Based on the evaluation of availability of portions of the system, Task 1 (24a) may be scheduled to a first portion of the system in block 156 and Task 2 (24b) may be scheduled to a second portion of the system in block 158. The power consumption of the second portion may then be reduced in block 160, which may result in the degradation of the performance of Task 2 (24b) in block 162. In this embodiment, the first portion and the second portion may operate at different levels of power consumption based on the relative criticalities of Task 1 (24a) and Task 2 (24b). For example, a task dispatcher might schedule the critical Task 1 (24a) to a subset of processing cores running in a higher power state and schedule the non-critical Task 2 (24b) to a different subset of processing cores running in a lower power state. Task 1 (24a) may change from critical to non-critical. The criticality of Task 1 (24a) may be reevaluated in block 164. The criticality indicator of Task 1 (24a) may be set to non-critical in block 166. Task 1 (24a) may now be scheduled to the second portion of the system in block 168. The power consumption of the first portion may be reduced in block 170 because Task 1 (24a) has been scheduled to the second portion, or the first portion may be used for other critical tasks.

In another embodiment, where only non-critical tasks are ready to execute, the non-critical tasks may all be scheduled to a single portion of the system, allowing other portions of the system to be shut down. This would impact the performance of the non-critical tasks compared to scheduling the non-critical tasks across all portions of the system due to increased competition for system resources. But, shutting down portions of the system may save significant amounts of power. One skilled in the art will realize that the illustrated embodiments only show some of the numerous schemes available to utilize task criticality to manage power consumption consistent with the principles of the invention.

An indicator may be associated with the criticality value of each task resident in system memory 14. There are multiple methods in which to set the criticality of a task. For example, the system administrator may set the criticality value for a specific task. The system administrator may set task criticality by viewing the criticality values associated with tasks currently resident in system memory 14 and then manually change the criticality of at least one of the tasks. One skilled in the art will recognize that this method is analogous to the existing method in which a system administrator may view and appropriately adjust the priority of tasks currently resident in system memory 14. Alternatively, the criticality of a task may be set automatically, e.g., by an application or by an operating system. In such a scheme, a programmer may have designed program code associated with the task to automatically set the criticality of a task to some default value upon the start of task execution. Alternatively, an operating system may assign a criticality based upon some characteristic of the task, e.g., whether the task is a background or batch task versus an interactive task. The operating system may also determine that there are a large number of non-critical tasks, or that the non-critical tasks have been unable to execute for a long period of time. Based on that determination, the operating system may choose to temporarily increase the criticality of some portion of those tasks in order to ensure that they do get an opportunity to run eventually. Of course, this behavior could be influenced by the power management policy. Task criticality may also be set by inheritance. For example, the criticality of a thread may be inherited from its parent process. One of ordinary skill in the art will understand that there are a number of methods for assigning or adjusting the task criticality.

The task associated with a criticality value may also have an associated priority value. While the criticality and priority of a task may be related, they are nonetheless separate. Thus, a task may have a high priority value and a low criticality value, a low priority value and a high criticality value, a high priority value and a high criticality value, a low priority value and a low priority value, or any other range of priority and criticality values, including mid-range values. The criticality of a task may also change during the execution of the task. For example, the previously discussed JIT Compiler thread may be critical during the startup of the JVM when code is initially loaded and interpreted. But, the criticality of the JIT Compiler thread may decrease after most of the frequently executed code has been compiled at a low optimization level and the JIT is only performing further optimization.

The task criticality value may be implemented by adding one or more bits to the task structure to indicate whether the task is critical enough to keep the system in a high power state. A one bit binary flag, indicating either a "critical" or "non-critical" status, may be used to represent task criticality. Alternatively, multiple bits may be used to implement a range of criticality. Multiple bit schemes may allow for a more sophisticated management of power consumption, but require tracking more information for each task.

While all of the present invention has been illustrated by a description of various embodiments and while these embodiments have been described in considerable detail, the applicant does not intend to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of managing power consumption in a computer system, the method comprising:
    assigning each of a plurality of tasks executing in the computer system a criticality value, the criticality value controlling a degree with which a performance of the task can be degraded in order to reduce power consumption in the computer system, wherein each task has a priority value, and wherein a first task of the plurality of tasks has a priority value that is higher than a priority value of a second task, and the first task has a lower criticality value than a criticality value of the second task;
    scheduling the first task and the second task for execution by the computer system based on the respective priority values; and
    controlling power consumption in the computer system based on the criticality values associated with at least a subset of the tasks executing in the computer system, including reducing power consumption of at least a portion of the computer system during execution of the first task among the plurality of tasks by the at least a portion of the computer system based at least in part on the criticality value associated with the first task such that performance of the first task is degraded relative to performance of the second task to conserve power consumption.

2. The method of claim 1 wherein managing power consumption further includes degrading performance of the first task, wherein performance of the first task is degraded by using an operation selected from a group consisting of: pausing the first task, executing the first task at a slower speed, stopping the first task, executing the first task using resources being shared by other tasks, and combinations thereof.

3. The method of claim 1 wherein the criticality values of the first task and a second task executing in the computer system each indicate a non-critical status, and wherein managing power consumption includes, based upon the criticality values of the first and second tasks indicating the non-critical status:
    scheduling the first and second tasks to execute on a first portion of the computer system; and
    reducing power consumption of a second, unused portion of the computer system.

4. The method of claim 1 further comprising:
    assigning the priority value to each of the plurality of tasks such that each task is assigned both a priority value and a criticality value, the priority value controlling workload balancing and execution priority of each task in the computer system.

5. The method of claim 4 wherein the criticality value of the first task is based at least in part on the priority value of the first task.

6. The method of claim 1 further comprising changing the criticality value of the first task during the execution of the first task.

7. The method of claim 1 wherein managing power consumption further includes accessing a power management policy to determine whether to reduce power consumption in the portion of the computer system.

8. The method of claim 7 wherein the power management policy dictates reducing power consumption by performing an operation selected from the group consisting of: reducing a clock rate of at least a portion of the computer system, reducing a voltage of at least a portion of the computer system, partially or completely shutting down at least a portion of the computer system, and combinations thereof.

9. The method of claim 7 wherein the first task is selected from the group consisting of a process and a thread.

10. The method of claim 1 wherein associating criticality values with the plurality of tasks includes associating an indicator with the criticality value of each task of the plurality of tasks, and wherein managing power consumption includes:
    accessing the indicator for the first task to determine if the performance of the first task can be degraded.

11. The method of claim 10 wherein the indicator comprises a binary flag representing either a critical or non-critical status.

12. The method of claim 10 wherein the indicator comprises a flag containing multiple bits defining a range for the criticality value.

13. The method of claim 1 wherein the first task comprises a process, wherein the process includes at least one thread, and wherein a criticality value of the thread is inherited from the process.

14. An apparatus comprising:
    a processor; and
    a memory storing program code configured to be executed by the processor to manage power consumption in a computer system, the program code configured to assign each of a plurality of tasks executing in the computer system a criticality value, the criticality value controlling a degree with which a performance of the task can be degraded in order to reduce power consumption in the computer system, wherein each task has a priority value, and wherein a first task of the plurality of tasks has a priority value that is higher than a priority value of a second task, and the first task has a lower criticality value than a criticality value of the second task, schedule the first task and the second task for execution by the computer system based on the respective priority values, and control power consumption in the computer system based on the criticality values associated with at least a subset of the tasks executing in the computer system, including reducing power consumption of at least a portion of the computer system during execution of the first task among the plurality of tasks by the at least a portion of the computer system based at least in part on the criticality value associated with the first task such that performance of the first task is degraded relative to performance of the second task to conserve power consumption.

15. The apparatus of claim 14 wherein the program code configured to manage power consumption is further configured to degrade performance of the first task, wherein performance of the first task is degraded by using an operation selected from a group consisting of: pausing the first task, executing the first task at a slower speed, stopping the first task, executing the first task using resources being shared by other tasks, and combinations thereof.

16. The apparatus of claim 14 wherein the criticality values of the first task and a second task executing in the computer system each indicate a non-critical status, and wherein the program code configured to manage power consumption is further configured to, based upon the criticality values of the first and second tasks indicating the non-critical status:
    schedule the first and second tasks to execute on a first portion of the computer system; and
    reduce power consumption of a second, unused portion of the computer system.

17. The apparatus of claim 14 wherein the program code is further configured to:
    associate a priority value with each of the plurality of tasks such that each task is associated with both a priority value and a criticality value.

18. The apparatus of claim 14 wherein the program code configured to associate criticality values with the plurality of tasks is further configured to associate an indicator with the criticality value of each task of the plurality of tasks, and wherein the program code configured to manage power consumption is further configured to:
    access the indicator for the first task to determine if the performance of the first task can be degraded.

19. The apparatus of claim 14 wherein the first task comprises a process, wherein a criticality value of the process is inherited from a parent of the process.

20. A program product, comprising:
    a recordable computer readable medium storing program code configured to manage power consumption in a computer system, the program code resident on the computer readable medium and configured to be executed by a processor of the computer system to assign each of a plurality of tasks executing in the computer system a criticality value, the criticality value controlling a degree with which a performance of the task can be degraded in order to reduce power consumption in the computer system, wherein each task has a priority value, and wherein a first task of the plurality of tasks has a priority value that is higher than a priority value of a second task, and the first task has a lower criticality value than a criticality value of the second task, schedule the first task and the second task for execution by the computer system based on the respective priority values, and control power consumption in the computer system based on the criticality values associated with at least a subset of the tasks executing in the computer system, including reducing power consumption of at least a portion of the computer system during execution of the first task among the plurality of tasks by the at least a portion of the computer system based at least in part on the criticality value associated with the first task such that performance of the first task is degraded relative to performance of the second task to conserve power consumption.

21. A method of managing power consumption in a multi-core computer system comprising a plurality of processing cores, the method comprising:
    assigning each of a plurality of tasks executing in the computer system a criticality value, the criticality value controlling a degree with which a performance of the task can be degraded in order to reduce power consumption in the computer system, wherein each task has a priority value, and wherein a first task of the plurality of tasks has a priority value that is higher than a priority value of a second task, and the first task has a lower criticality value than a criticality value of the second task;
    scheduling the first task and the second task for execution by the computer system based on the respective priority values; and
    controlling power consumption in the multicore computer system based on the criticality values associated with at least a subset of the tasks executing in the multicore computer system, including reducing power consumption of a first subset of processing cores among the plurality of processing cores in the computer system relative to a second subset of processing cores among the plurality of processing cores, scheduling the first task among the plurality of tasks to execute on a processing core of the first subset of processing cores based at least in part on the criticality value associated with the first task, and scheduling the second task among the plurality of tasks to execute on a processing core of the second subset of processing cores based at least in part on the criticality value associated with the second task to conserve power consumption associated with executing the first task.

22. The method of claim 21, wherein managing power consumption includes:
- scheduling each task from among the plurality of tasks that is associated with a low criticality value to execute on a processing core from the first subset of processing cores; and
- scheduling each task from among the plurality of tasks that is associated with a high criticality value to execute on a processing core from the second subset of processing cores.

23. The method of claim 21, wherein managing power consumption includes, in response to determining that only tasks associated with a low criticality value are executing on the multicore computer system:
- scheduling each task to execute on a processing core from a third subset of processing cores; and
- configuring at least one processing core from a fourth subset of processing cores to enter a low power state.

* * * * *